(12) United States Patent
Lopata et al.

(10) Patent No.: US 7,669,116 B2
(45) Date of Patent: Feb. 23, 2010

(54) SINGLE ACCESS POINT FOR FILING OF CONVERTED ELECTRONIC FORMS TO MULTIPLE PROCESSING ENTITIES

(75) Inventors: Iain Lopata, Deerfield, IL (US); Andrew J. Pitman, Dunwoody, GA (US); Scott Gilliland, Chicago, IL (US); Robert Matles, Chicago, IL (US); San Retna, San Mateo, CA (US)

(73) Assignee: Accenture Global Services, GmbH, Palo Alto, CA (US)

( * ) Notice: Subject to any disclaimer, the term of this patent is extended or adjusted under 35 U.S.C. 154(b) by 110 days.

(21) Appl. No.: 10/107,719

(22) Filed: Mar. 26, 2002

(65) Prior Publication Data

US 2004/0205533 A1    Oct. 14, 2004

(51) Int. Cl.
*G06F 17/24* (2006.01)
*G06F 7/00* (2006.01)
*G06F 15/16* (2006.01)

(52) U.S. Cl. .................. 715/224; 715/225; 715/234; 715/249; 707/3; 707/10; 707/103 R; 709/203

(58) Field of Classification Search ................ 715/517, 715/507, 500.1, 501.1, 506, 508, 221, 222, 715/224, 225, 226, 234, 733, 760, 200, 201, 715/205, 210, 229, 249, 255, 256, 265, 273, 715/744, 746; 705/26, 27; 707/10, 100, 707/1–4, 6, 7, 101, 103 R, 200; 703/217; 709/201–203, 217, 219
See application file for complete search history.

(56) References Cited

U.S. PATENT DOCUMENTS 4,658,366 A  *  4/1987  Posh ........................... 715/507

(Continued)

FOREIGN PATENT DOCUMENTS

EP    0 451 485 A2    10/1991

(Continued)

OTHER PUBLICATIONS

Fan et al., "FormPlus: A Form Authoring Toolkit", IBM T.J. Watson Research Center, IEEE, 1990, pp. 255-260.*

(Continued)

*Primary Examiner*—Laurie Ries
*Assistant Examiner*—MaiKhanh Nguyen
(74) *Attorney, Agent, or Firm*—Finnegan, Henderson, Farabow, Garrett & Dunner, LLP

(57) ABSTRACT

Methods for efficiently publishing electronic versions of traditionally paper-based government forms and utilizing the electronic forms for web-based transactional services are disclosed. Standard paper-based government forms are automatically converted to XML format, including data fields for entry of information by customers. Multiple electronic forms are accessible to the customer at a single access point, such as a web site. At the web site, the customer selects a form for filing with any of a plurality of government agencies. When presented to the customer, the selected form is presented with some of its data fields being pre-populated according to information retrieved from a database and specific to that customer. The customer completes the form, and a back-end system integrated with the web site handles the completed form, determines the appropriate government agency for filing the form, and transmits it as a transaction to the determined government agency.

27 Claims, 8 Drawing Sheets

U.S. PATENT DOCUMENTS

| | | | |
|---|---|---|---|
| 5,050,222 A * | 9/1991 | Lee | 382/176 |
| 5,231,510 A * | 7/1993 | Worthington | 358/400 |
| 5,331,547 A * | 7/1994 | Laszlo | 705/2 |
| 5,410,646 A * | 4/1995 | Tondevold et al. | 715/507 |
| 5,563,999 A * | 10/1996 | Yaksich et al. | 715/507 |
| 5,640,577 A * | 6/1997 | Scharmer | 715/507 |
| 6,026,187 A * | 2/2000 | Siegel | 382/213 |
| 6,084,585 A * | 7/2000 | Kraft et al. | 345/733 |
| 6,088,700 A * | 7/2000 | Larsen et al. | 707/10 |
| 6,199,079 B1 * | 3/2001 | Gupta et al. | 715/507 |
| 6,229,894 B1 * | 5/2001 | Van Oorschot et al. | 713/150 |
| 6,247,029 B1 * | 6/2001 | Kelley et al. | 715/507 |
| 6,272,506 B1 * | 8/2001 | Bell | 715/507 |
| 6,289,348 B1 * | 9/2001 | Richard et al. | 707/10 |
| 6,292,827 B1 * | 9/2001 | Raz | 709/217 |
| 6,314,415 B1 * | 11/2001 | Mukherjee | 706/47 |
| 6,345,278 B1 * | 2/2002 | Hitchcock et al. | 707/100 |
| 6,460,042 B1 * | 10/2002 | Hitchcock et al. | 707/10 |
| 6,704,906 B1 * | 3/2004 | Yankovich et al. | 715/222 |
| 6,711,554 B1 * | 3/2004 | Salzmann et al. | 705/64 |
| 6,725,220 B2 * | 4/2004 | Stratigos et al. | 707/10 |
| 6,772,216 B1 * | 8/2004 | Ankireddipally et al. | 709/230 |
| 6,898,707 B1 * | 5/2005 | Sit et al. | 713/167 |
| 7,110,976 B2 * | 9/2006 | Heimermann et al. | 705/37 |
| 7,194,426 B1 * | 3/2007 | Box | 705/26 |
| 7,203,663 B1 * | 4/2007 | Buisman et al. | 705/38 |
| 7,346,665 B2 * | 3/2008 | Courtemanche et al. | 709/217 |
| 2001/0034744 A1 | 10/2001 | Honma | |
| 2001/0054046 A1 * | 12/2001 | Mikhailov et al. | 715/500 |
| 2002/0178364 A1 * | 11/2002 | Weiss | 713/182 |
| 2003/0055669 A1 * | 3/2003 | Ryan et al. | 705/1 |
| 2003/1005566 * | 3/2003 | Ryan et al. | 705/1 |
| 2004/0064332 A1 * | 4/2004 | Zou et al. | 705/1 |

FOREIGN PATENT DOCUMENTS

WO     WO 98/59460     12/1998

OTHER PUBLICATIONS

Torben Pedersen, "Signature Server," NEWSONINK, XP—2215192, Crytomathic Newsletter, Jan. 2001, pp. 1-4.*
Hallam-Baker, Phillip M. "Client Side Autmotated Form Entry", W3C Working Draft WD-form-filling, Apr. 16, 1996, available at <"http://www.w3.org/TR/WD-form-filling.html">.*

* cited by examiner

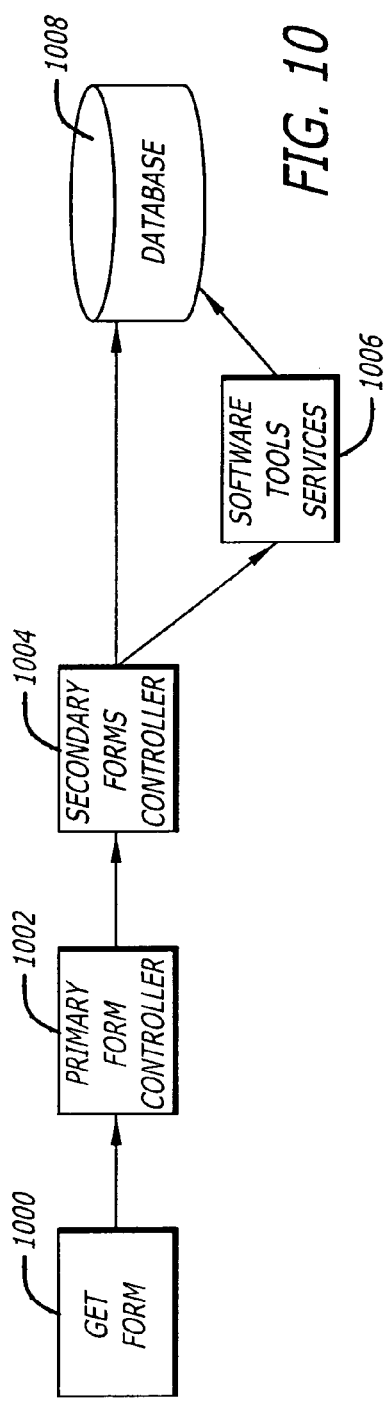
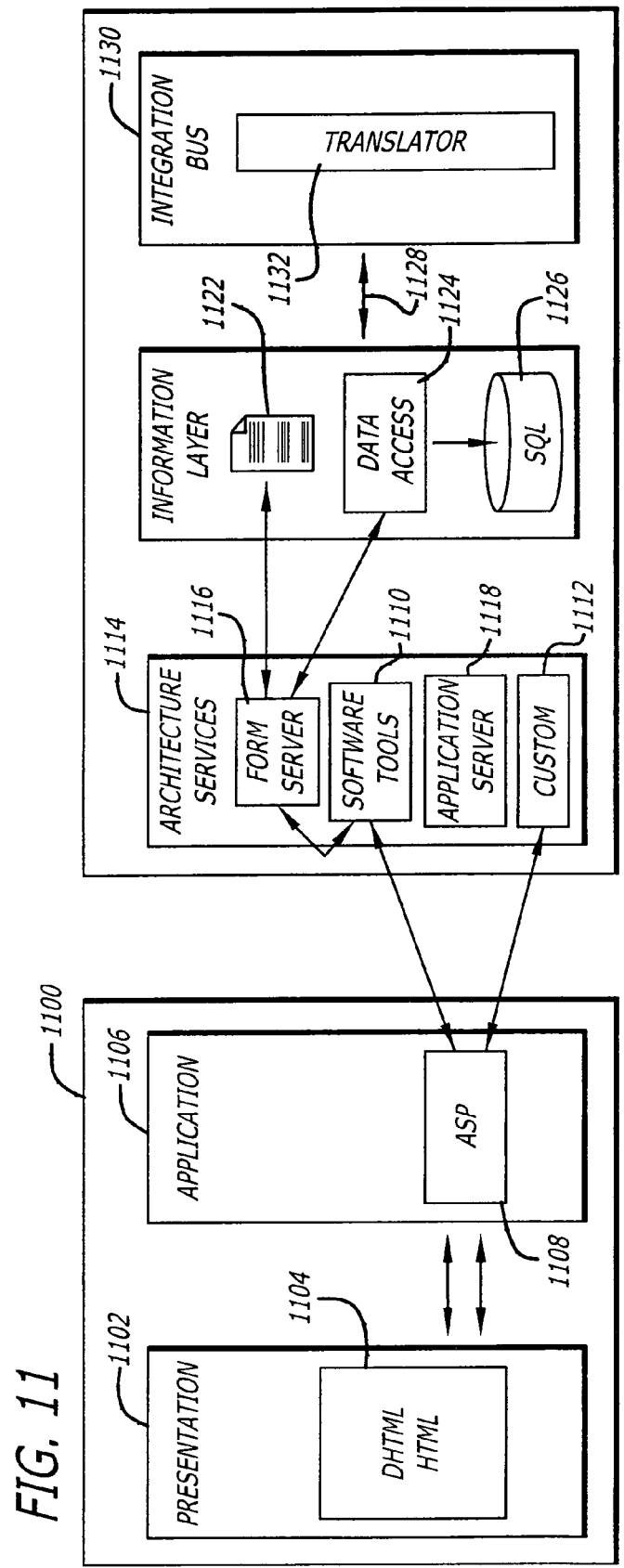

SINGLE ACCESS POINT FOR FILING OF CONVERTED ELECTRONIC FORMS TO MULTIPLE PROCESSING ENTITIES

BACKGROUND OF THE INVENTION

1. Field of the Invention

The present invention relates to computer based systems and methods for automatically providing electronic versions of standard, paper-based government agency forms for electronic form completion and filing. More particularly, the present invention relates to providing customers with a single access point for locating electronic government agency forms and submitting them for filing with any one of a plurality of government agencies for processing.

2. General Background and State of the Art

Compliance with various requirements involving filings of forms is a predestined activity for individuals around the world, whether related to government regulations, business requirements, or the like. In many cases, such requirements are fulfilled by the completion and filing of official government forms with various government agencies. Today, people and businesses fulfill such requirements through methods of interaction and communication with the government agencies that are often inefficient. These methods of communication typically involve time consuming processes that also involve significant monetary expenditures.

FIG. 1 illustrates one such prior art method of interaction with government agencies for the purpose of filing government forms. This commonly practiced paper-based method involves physically submitting forms by mail or in person to a government agency, a time consuming process that also involves significant monetary expenditures. First a customer must obtain a paper form from a government agency, as indicated at block 100. In an exemplary embodiment related to government forms, the customer may be a citizen or constituent. In other exemplary embodiments of the invention, the customer may be a different, relevant party to the transaction which the forms is designed to support. Often the form must be obtained either personally, such as by visiting the government agency or an associated form repository, or through the mail. Next, as indicated at block 102, the customer fills out the paper form, providing information in each of a plurality of blank spaces reserved for this purpose. Next, at block 104, the customer mails the form to the government agency, or personally delivers the form to the government agency. Then, at block 106, a data entry clerk at the government agency receives the completed form, re-enters the customer-provided information thereon into a computer-based system for receiving form data, and transmits the data to an existing government agency system 114. The existing government agency system 114 validates the data and proofreads the data to verify its accuracy with the customer-provided form data. During this validation process, the system considers whether the customer-provided data on the form is invalid or insufficient, or otherwise defective, as indicated at decision block 108. If further information is required from the customer to address an invalidity or insufficiency, as indicated at arrow 110, the customer may have to obtain another form and re-start the form completion and submission process. When the answer reached at decision block 108 is that the data is not invalid or insufficient, as indicated at arrow 112, the data entered by the data entry clerk and representative of the form data supplied by the customer is accepted by the existing government agency system for processing, as indicated at block 114.

A number of inefficiencies and drawbacks are often associated with the above-outlined procedures. First, as described above, customers may be required to repeat the time consuming process of obtaining, filling out, and submitting government forms if they make a mistake during their first attempt. Second, because existing government agency systems do not follow identical or consistent data processing standards, form data entered by data entry clerks must be entered according to the specific type of government agency system it is being transmitted to for processing. Inconsistencies between various government agency systems hinder the potential for a uniform method and style of data entry by data entry clerks. Data entry clerks therefore must utilize discretion in determining to which type of government agency system the undefined data from a received form will be transmitted, and then enter the data in a manner appropriate to that type. The decision making process is often inefficient, and the expanded skill set required of data entry clerks who must be familiar with a variety of different data types and government agency system types is also inefficient.

Attempts have been made to address some of the problems discussed above with respect to inefficiencies of paper-based form filing with government agencies. One method that attempts to address these problems is illustrated in FIG. 2, which is illustrates a second prior art method of interaction with government agencies for the purpose of filing government forms. The second method utilizes a computerized, web-based approach to minimize some of the inefficiencies of the older, paper-based methods. Although the web-based approach reduces involvement of paper forms in the interaction process, a number of inefficiencies are often inherent to and persist in such methods.

The prior art method of FIG. 2 requires a customer to obtain a form at block 200, such as from a government agency web site. The customer then prints the electronic version of the form, at block 202, and thus obtains a paper based version of the form. At block 204 the customer fills out the paper form, and at block 206 he mails the completed form to the desired government agency. As in the first prior art method described above, at block 208 a data entry clerk at the government agency then must re-enter the form data into a computer and submit the data to the existing government agency system 216. The existing government agency system 216 validates and proof reads the entered form data to ensure accuracy with the customer provided data on the paper form. After the data is re-entered, the system 216 must determine whether it is invalid or insufficient, as indicated at decision block 210. If, as indicated by arrow 212, it is determined that further information is required from the customer to correct an invalidity or insufficiency, the customer must begin the form retrieval, completion and submission process again. The process is repeated until the answer reached at decision block 210 is that the data is not invalid or insufficient, as indicated at arrow 214. At that time, the re-entered data is accepted by the existing government agency system, at block 216.

As in the first prior art method described above, the second prior art method of FIG. 2 includes many of the same inherent inefficiencies. Although customers no longer are required to personally obtain a copy of the form, the process for transmitting the completed form to a government agency remains slow, and the process of data validation remains inefficient. Also, the second prior art method does not overcome the previously described problems associated with non-uniformity of existing government agency systems Other prior art systems include web-based forms that may be submitted electronically. However, even these systems have undesirable inefficiencies associated with them. For example, without an efficient method of converting standard paper-based forms to on-line electronic forms, new systems cannot be rapidly developed, and new on-line versions of paper forms cannot be rapidly generated and added to existing systems. Costs associated with the time and labor of coding individual data fields to correspond to spaces on the paper forms for entering information contribute to the inefficiencies present in these types of prior art systems. Other contributors to the inefficiencies are attributed to ineffective means associating electronic forms to government agencies. For example, these prior art systems typically require customers to access forms directly from a web site of the applicable government agency. Therefore, in order to file multiple forms, the customer must visit multiple government agency web sites. Also, if a customer does not know which government agency a particular form is to be filed with, he will not know which web site to access in order to complete and submit the form.

There continues to be a need and a new market opportunity for a more efficient conduit for transactions between individuals and government. However, developing such a conduit for handling forms for a variety of government agencies who have different requirements and utilize different types of processing systems remains a challenge, particularly in the aspects of time and resource efficiency.

SUMMARY OF THE INVENTION

The present invention provides an electronic conduit between customers and a plurality of government agencies for the purpose of efficiently transacting with government forms. The transactions are efficient because the present invention eliminates the need for paper based forms and slow transmittal methods associated with traditional paper forms, provides a single access point for submitting form filings to one of a plurality of government agencies, and provides a robust architecture capable of spanning a plurality of non-uniform government agency systems. Moreover, the present invention provides the ability to continually add new government forms and update existing government forms quickly, and without changing the underlying architecture or construction of the processing system. In part, this novel ability to rapidly add new forms to existing systems is provided by a feature of the present invention wherein electronic versions of standard, paper-based forms are generated automatically, without needing to manually create code to define data entry fields and other important information contained on the forms. As used herein, "automatically converting" refers to creating an electronic from that visually represents a paper based form, including data entry fields that correspond to blank areas on the paper form for entering information, without manually coding the data entry fields or other important information on the form. For example, standard conversion software may be utilized to read an electronic image of a paper-based form, recognize various parts of the form within the electronic image such as data entry blanks and descriptive information, and convert the electronic image into an electronic form including data fields that correspond to the recognized data entry blanks. Those skilled in the art will understand that a variety of different software tools are available for such recognition and conversion tasks.

The present invention includes methods for efficiently publishing traditionally paper-based government forms on the web and utilizing the published electronic forms for web-based transactional services between government agencies and customers. First, standard paper-based government forms are converted to electronic forms in a computer readable format such as XML. The electronic forms have the appearance of the traditional paper-based forms, including data fields for entry of information by customers, yet their automatic conversion to electronic forms does not require manual coding of data entry fields and other important information included on the forms. Multiple electronic forms are accessible to the customer at a single access point, such as on a web site. At the web site, the customer selects a form for filing with a government agency. When presented to the customer, the selected form may have some of its data fields being pre-populated according to information retrieved from a database and specific to that customer. The customer completes the remaining data fields of the form, and submits it for handling and processing. After the customer submits the completed form, a back-end system integrated with the web site handles the completed form, determines the appropriate government agency for filing the form, converts the form data to a compatible format for the determined government agency, and transmits it as a transaction to the determined government agency.

Other features of the present invention include attachment of files to the electronic forms for co-submission to government agencies, and provision of digital signatures to the electronic forms for authentication. Also, the web-based interface between government agencies and customers may be supplemented or replaced by an audio interface, which is described in further detail below.

BRIEF DESCRIPTION OF THE DRAWINGS

FIG. 7 illustrates an exemplary embodiment of the invention wherein government forms are rapidly prepared for presentation and processing.

FIG. 10 illustrates an exemplary embodiment of the invention involving a computer application architecture for processing electronic forms.

FIG. 11 illustrates an interaction between an on-line electronic form and a computer system for managing and processing the form.

DETAILED DESCRIPTION OF EXEMPLARY EMBODIMENTS

Figure 2:
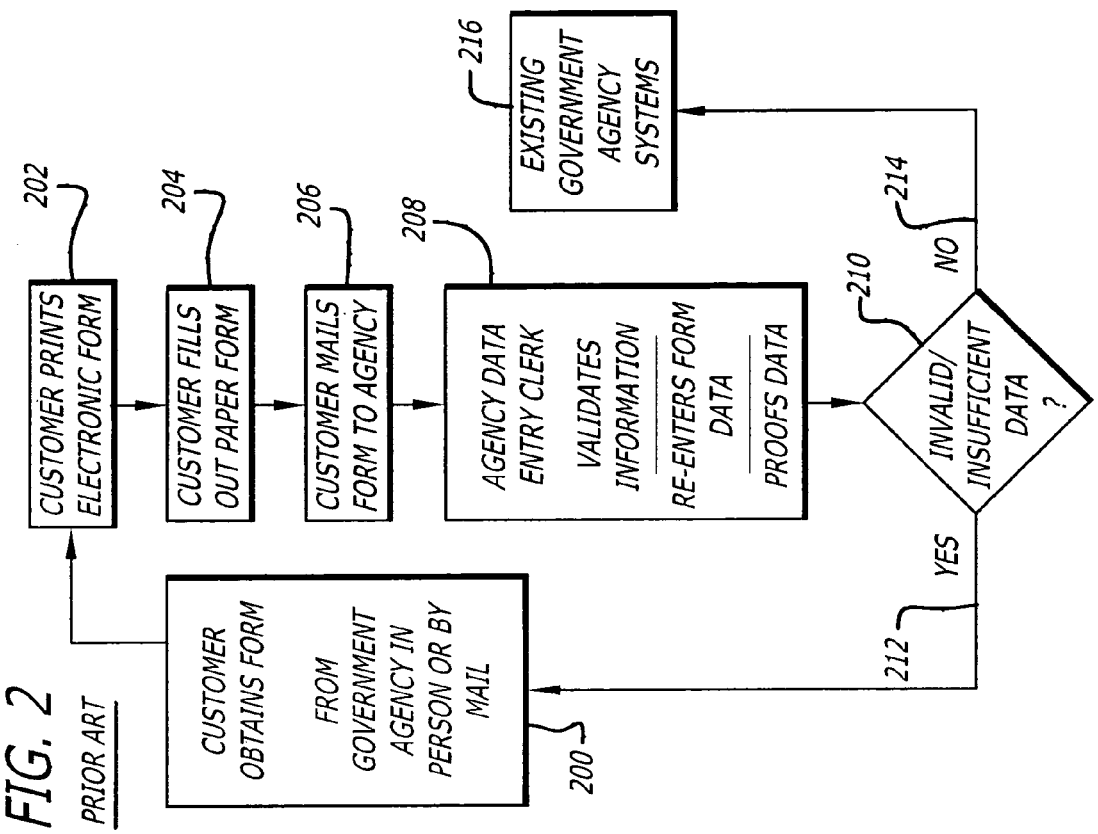
FIG. 2 illustrates a prior art process for web-based government forms processing.
Figure 1:
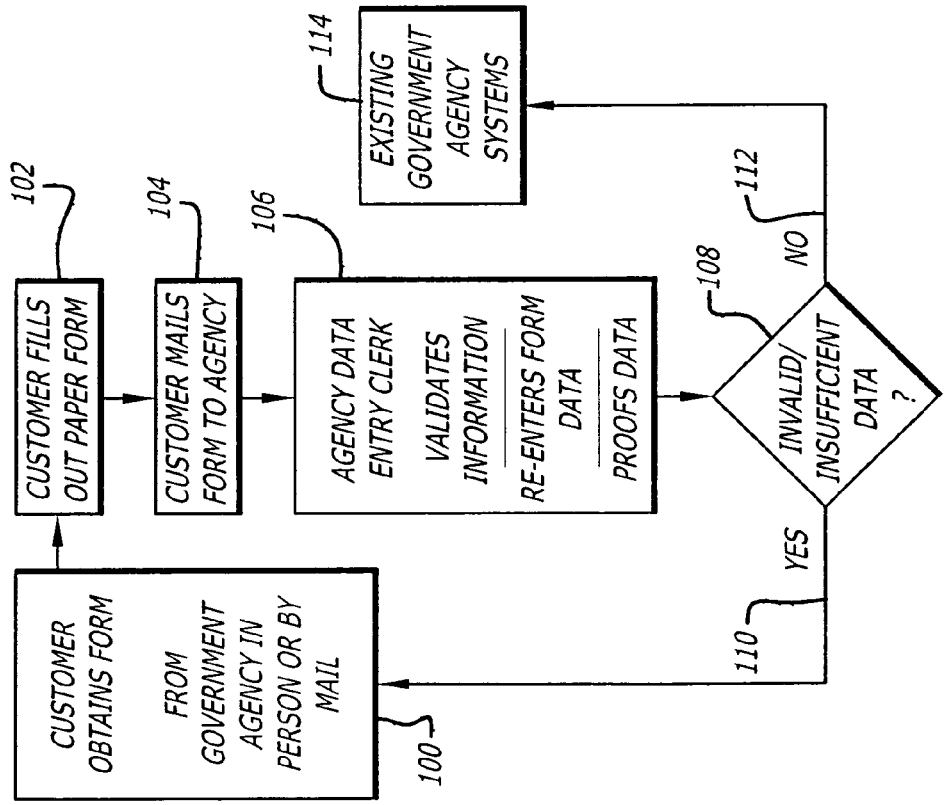
FIG. 1 illustrates a prior art process for paper-based government forms processing.
Figure 3:
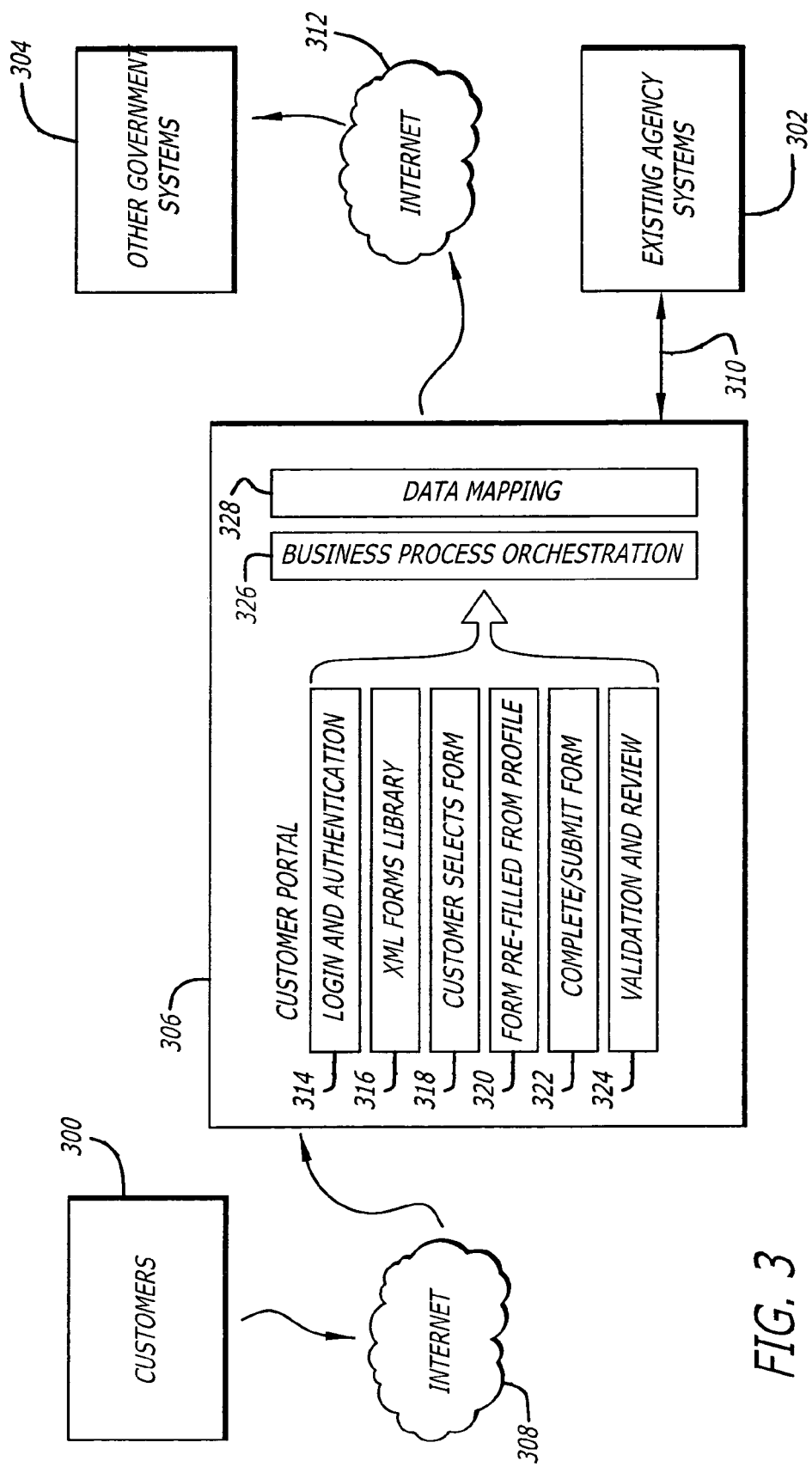
FIG. 3 is a block diagram of an exemplary embodiment of the present invention involving a method for efficient government forms processing.

FIG. 3 illustrates an exemplary embodiment of the present invention including a method for efficient government forms processing. According to the method of the present invention, customers 300 interact and participate in transactions with government agencies by transmitting electronic government forms to existing government agency systems 302. The method of the present invention also supports interaction between customers 300 and other government systems 304 that may be continuously added or updated without changing the architecture or underlying code of the interface mechanism between customers 300 and existing agency systems. Therefore, the present invention provides a robust and easily scalable software architecture for supporting customer interaction and efficient transacting with various, non-uniform government agency systems. Examples of government agencies the present invention may be utilized with are national government branches and agencies, local government units, and business partners of government agencies. Moreover, the present invention may be practiced with non-government agencies that engage in processing of standardized forms.

The present invention provides a single access point 306 for submitting filings of forms to one or more of a plurality of government agencies. The single access point 306 may be a customer portal to existing government agency systems 302 and other government systems 304 such as, for example, a web page or other similar site accessible through the Internet or other computer communications network. The single access point 306 includes a plurality of functions for the customer to employ, and includes an integration layer that provides a smooth interface between those customer-performed functions and back end preparation for transmission of customer-submitted information to government agencies. Customers access the single access point 306 through a computer network such as the Internet. Data from forms completed by a customer and submitted for transmission to a government agency may be transmitted to the government agency system through a private computer network according to a communications protocol 310 particular to the existing agency systems or, alternatively, through a public computer network 312 such as the Internet.

Specific customer-performed functions at the single access point 306 include login and authentication 314, access to a forms library 316 that stores a plurality of forms in a computer readable format such as, for example, XML, selection mechanism 318 allowing the customer to select one of the forms within the forms library 316, a cross-population mechanism 320 for pre-populating certain fields of the selected form with customer-specific data prior to presenting the selected form to the customer, editing and transmission means 322 for allowing the customer to enter information into data fields of the selected form and to submit a completed form for transmission to a government agency, and a validation and review mechanism 324 for verifying customer-entered data in a submitted form.

Once the customer has submitted a form for transmittal to a government agency, back-end processing at the single access point 306 occurs. Alternatively, the back end processing may occur on a machine or at a location remote to the single access point 306 but operatively connected thereto. The processing of the data in the submitted form prepares it for eventual transmission, in a proper format, to the existing agency systems 302 or other government systems 304. Business process orchestration software 326 is utilized by methods of the present invention to provide logic for determining which of a plurality of government agencies the submitted form should be transmitted to. Associations between forms stored in the file library 316 and the government agency to which it applies are stored in a database accessible by the logic, and the associations are used to determine which government agency any customer-selected form should be transmitted to. Also, business process orchestration software determines the proper format for data from the submitted form in order to be properly received and processed by the government agency systems 302, 304. Once the appropriate government agency and proper data format are determined, data mapping software 328 converts the data from a submitted form to the proper data format. The data is then transmitted to the appropriate government agency for processing.

Although the exemplary embodiment described above utilizes a web page as the single access point 306, other implementations may be practiced within the scope of the present invention. An alternative example involves an audio interface, such as through a telephone 408, illustrated in FIG. 4. In this alternative embodiment, the single access point 306 is a telephone 408 or other audio communication means. The customer receives instructions to provide certain pieces of information that are associated with blank fields of a computer form. The customer then can use a keypad on the telephone to enter the information. The forms processing system then translates the telephone-enabled data entry performed by the customer to data that is filled into the appropriate blank fields of the computer form, and the forms processing system continues as in the exemplary embodiment described above. The telephone call, in this alternative embodiment, may be initiated either by the customer when he wants to file a form, or by a forms processing system itself, when it determines that a form is due to be filed according to a calendaring component which will be described in more detail below. Of course, the single access point 306 may also be a television 410 or personal digital assistant (PDA) 406, as illustrated in FIG. 4, which is now described in further detail.

Figure 4:
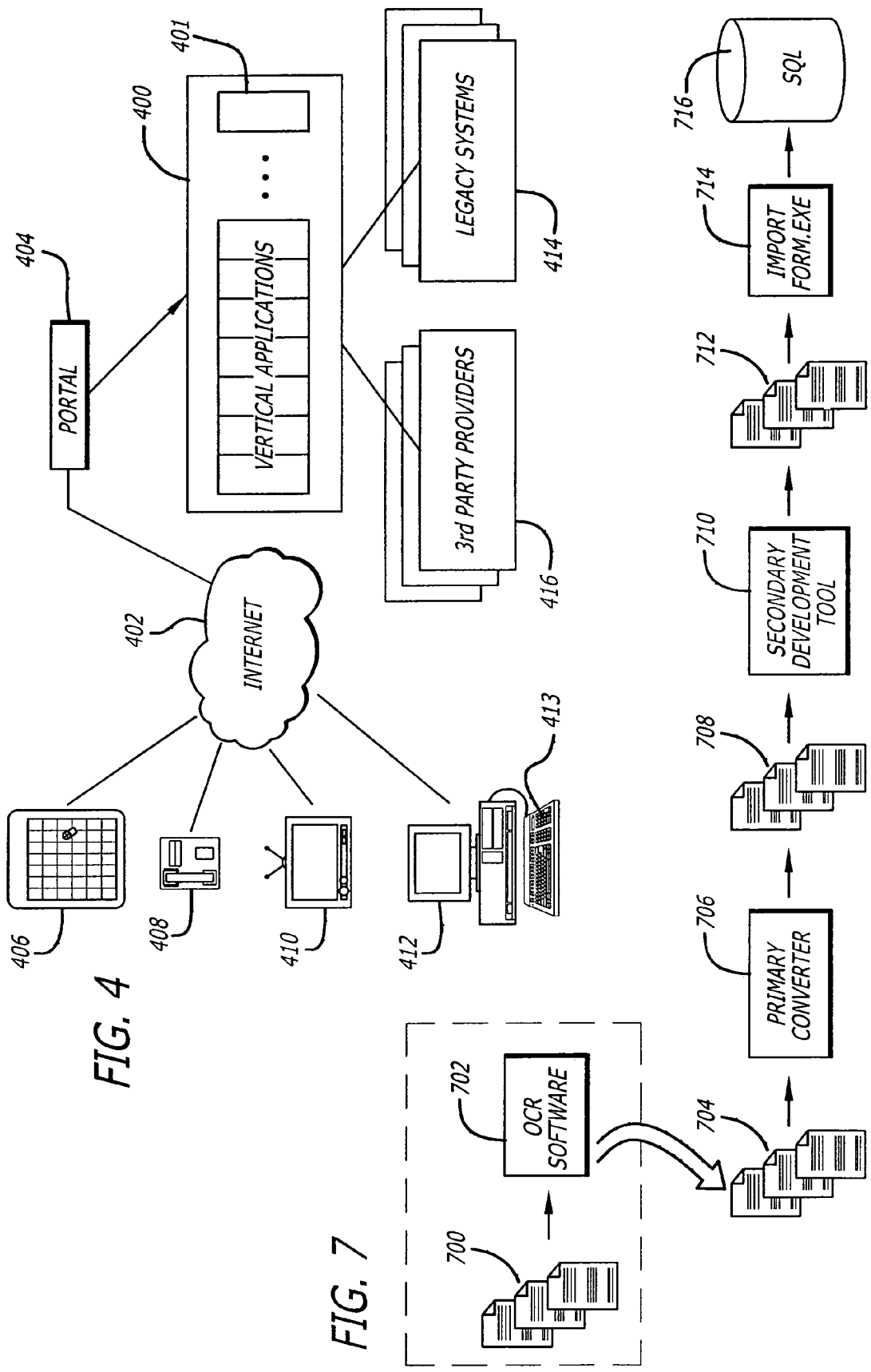
FIG. 4 illustrates an exemplary embodiment of the present invention involving a computer application architecture for supporting efficient government forms processing.

FIG. 4 illustrates an exemplary embodiment of the present invention involving a computer application architecture for supporting efficient government forms processing. According to the present invention, customers access an application set 400 that includes a plurality of vertical applications 401 for use with forms transactions. The exemplary embodiment including the grouped vertical applications 401 ensures modularity and flexibility of the architecture by clearly separating the presentation of forms, business processes associated with forms, and core architecture components of systems designed in accordance with the teachings of the invention. The modularity of vertical applications 401 results in a plurality of services and products associated with government forms to be accessible to customers through multiple channels including. Also, the use of vertical applications 401 enables leverage between multiple systems such that identical applications can be used in multiple systems without rebuilding the applications. This allows for rapid construction of new systems for new business partners who wish to implement the methods and build systems according to the present invention, a feature of the present invention that will be discussed in further detail below.

Customers access application set 400 through a communications network 402 such as the Internet. Specifically, a customer may access vertical applications 401 within the application set 400 through an established and existing portal 404, chosen from among a plurality of web portals that are well known in the art. As a means of engaging a portal 404, customers may use a PDA 406, a telephone 408, a television 410, a personal computer equipped with a web browser 412 and peripheral data entry device such as a keyboard or mouse 413, or other capable means. Once the customer has access to the vertical applications 401, he may engage or execute them. Examples of vertical applications functionality include, but are not limited to, sales and use tax, unemployment insurance, license renewal, business registration, and the like. Execution of the vertical applications 401 may require access to outside systems and interaction with those systems. For example, user registration, forms handling and enablement, and profile management may include access to legacy systems 414 of existing government agencies or the like for processing of certain information associated with those functions. Also, security may require access to systems of third party providers 416, for example, to obtain PKI certificates, authentication and verification of payment information, and the like.

As indicated above, the present invention provides the advantage of rapid construction and deployment of applications when developing new systems. A robust application platform 400, is provided, according to methods of the present invention, such that all necessary services required to develop vertical applications are available for system developers. Examples of application services include, but are not limited to, customer registration wherein personal data about a customer is collected, customer profile management wherein the personal data is stored and maintained, electronic forms handling and enablement which controls the interaction of customers with selected electronic forms, security infrastructure, interface and orchestration architecture for managing customer completed forms and transmitting them to appropriate government agencies in the proper format for processing thereby, user notification and messaging for communicating with customers regarding status of forms, and cataloguing of completed and submitted forms for future reference and retrieval of customer specific data within the completed forms. The application platform 400 includes application frameworks and reusable application services that allow applications to be written for new systems. In an exemplary embodiment, the application platform 400 provides the "API" set to all the common application services. Therefore, upon the application platform 400, vertical applications can be quickly built by developers to re-use the architecture services and common data services for a variety of functions, as described above.

Because the architecture of systems according to the present invention provide the infrastructure to quickly build a wide variety of web applications, including the ability to leverage architecture services and re-use previously built applications of business partners, applications integral to the processing of government forms for any purpose can be brought online for customer use to provide a wide variety of services in an accelerated manner. Examples of applications that may be rapidly built upon the application platform using the robust infrastructure of the present invention include, but are not limited to, applications for state sales and use tax, insurance, workforce development, electronic child support, integrated police management, paperless courts, offender transportation logistics, higher education electronic services, on-line training, budgeting and financial analysis, and withholding tax.

The present invention encompasses a wide variety of application services for inclusion in application platform 400. These application services may include, for example, a variety of presentation services 500, application services 502 and data services 504. In an exemplary embodiment, presentation services 500 include posting of forms 506, branding of forms 508 and XSL/XML capabilities 510. Data services 504 include various forms applications 512 for handling form data, applications for handling communication with third parties 514 for various third party services, customer profile applications 516 and integration applications 518, performed back-side, for integrating form data with government agency systems for processing the data.

In addition to presentation services 500 and data services 504, application services 502 includes a wide array of functions for users of systems according to the present invention. As used herein, users of such systems refer to back-end users, who are typically system administrators of business partners, and business partners include those businesses who have built systems according to the present invention to provide an electronic conduit, according the methods of the present invention, for transacting with government agencies using forms. Customers, on the other hand, refer to front-end users of such systems, or those who access the system from a single access point for the purpose of obtaining, completing and submitting forms for transmittal to government agencies.

Continuing with the description of application services 503, a transaction engine 520, in an exemplary embodiment, uses COM+ for executing transactions involving forms such that the transactions can be leveraged across any application developed within the system. Of course, the invention is not limited to the specific software embodiments disclosed herein, and it will be recognized by those skilled in the art that other implementations are also possible. For example, MICROSOFT's WINDOWS.NET product may be effectively used without the need for COM, and those skilled in the art will recognize other new methods for practicing the present invention as technology develops. A payment and billing service 522 allows customers to submit payment to government agencies and may involve users to access, through the back-end of the system, third party providers for payment verification, payment processing and the like. A profiling component 524 allows for the storage and retrieval of information related to the customers, such as name, address, and other personal information. A reporting engine 526 accesses data regarding customers and transactions involving forms, and generates customized reports containing information related to those customers and transactions, as specified by the users. In this way, users can view histories of transactions, establish transacting trends, and perform other valuable reporting functions. A portal services application service 528 provides access for the user to the system through portals, using any of a plurality of well known channels and communications protocols. In an exemplary embodiment, the portal services application service 528 may be an Active Server Pages (ASP) application. Of course, the invention is not limited to the specific software implementations discussed herein. For example, ASPx may be used instead of ASP, and it is anticipated that the present invention may also be practiced with enhanced or new portal services application software as that technology develops.

An e-mail application service 530 provides outgoing e-mail management. The management is handled by architecture APIs that leverage an application server's SMTP service. In an exemplary embodiment, the application server is MICROSOFT Commerce Server 2000. As will be recognized by those skilled in the art, however, any commerce server software may be employed in systems of the present invention. The e-mail application 530 involves calendaring of forms transactions for the benefit of a customer, and generates e-mail messages for the customer to inform him about upcoming forms transactions. For example, e-mail application 530 may determine, when a customer submits a registration form, that renewal of the registration will be due in a certain prescribed amount of time. The e-mail application will calendar a reminder date in advance of the determined due date and, on the reminder date, will generate and send to the customer an e-mail reminding him that a renewal form is due. The customer will then return to the single access point, select the renewal form from the forms library, complete the form, and submit it so that the system will file it with the appropriate government agency. An additional feature of the e-mail application 530 might include the ability for the customer to calendar his own dates for e-mail reminders to be generated and delivered.

A security application service 532 provides the framework for authentication services that are provided through APIs which use security features of the application server. A message logging application service 534 allows all the applications to raise events or messages to the event viewer. This allows applications to notify the system and system operator of events that require handling or action. A search application 536 enables users to perform a variety of searches, such as searches for forms in a forms library, or searches of transactions in the profiling records described above. A content management application service 538 allows users to access the content of the single access point and perform a variety of editing and managing functions to manage that content. An error handling application service 540 employs specialized software tools for handling errors or thrown exceptions in all vertical applications in a common way. This provides for uniformity among the set of vertical applications for ease of administration and tracking of errors and exceptions. In an exemplary embodiment, the specialized software tools are included in AVANADE CONNECTED ARCHITECTURE (ACA), but it will be recognized by those skilled in the art that other similar software tools may alternatively be employed to develop systems according the present invention. A help services application service 542 provides a number of functions including, but not limited to, text instructions to customers and users regarding operation of the system and the various applications therein. A state management application service 544 manages the passing of information between screens or applications within a given session. The management, in an exemplary embodiment, is handled through the application server framework, and may employ cookies when enabled or encrypted URL encoding. A form services application 546 performs rendering of forms for the browser, calculation and validation of data within form fields as entered by customers, and other form related functions. Of course, the applications services that may be included to enhance and support the vertical applications set is not limited to the above-described examples. Rather, the present invention encompasses all applications and supporting application services that may be rapidly built and developed upon application platform 400 and used by customers and users for the presentation, selection, completion, submission, handling, organization, and transmitting of electronic versions of government forms.

Figure 6:
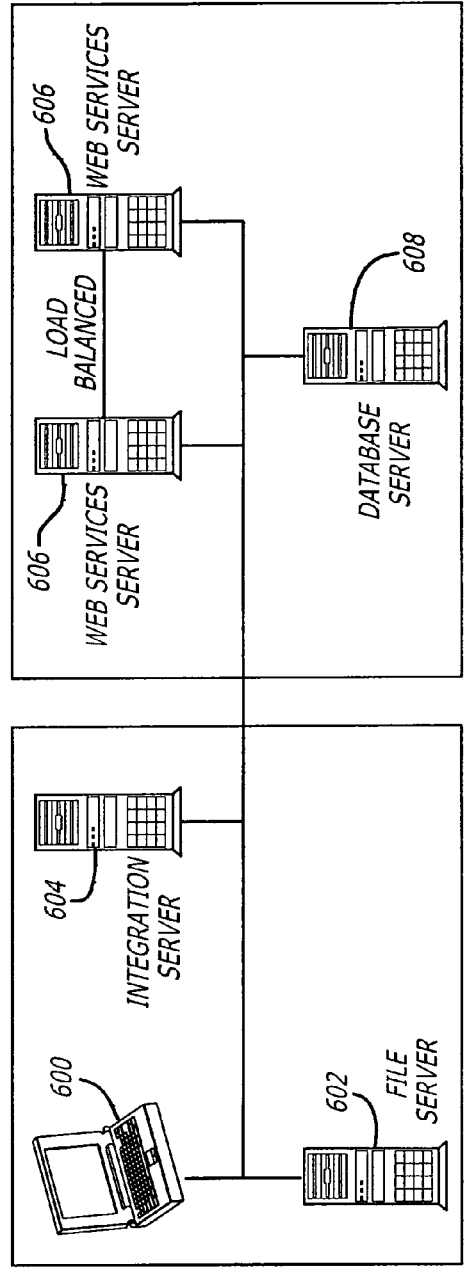
FIG. 6 illustrates a development architecture that supports rapid, modular development of a form processing system.

FIG. 6 illustrates an exemplary embodiment of the invention wherein a robust development architecture supports rapid, modular development of a form processing system. A laptop 600 or other personal computer is communicatively connected to a computer configured to be a file server 602. Laptop 600 and file server 602 communicate via TCP/IP with each other as well as with a third computer configured to be an integration server 604. A plurality of computers configured to operate as web services servers 606 are also load balanced and in communication with the other computers as well as a computer configured to be a database server 608, also via TCP/IP. Using this architecture model and the application platform previously described, developers are able to quickly build new forms processing systems.

Laptop 600 is used to develop forms for use in the forms processing systems. Development of forms includes production of electronic forms that visually represent government paper forms, including a plurality of data fields that correspond to blank locations on the paper forms where information is to be entered by a customer. The production of electronic forms includes conversion of electronic images of government forms to actual electronic forms with data fields that can be populated. The electronic images of government forms may be, for example, PDF format files, and the actual electronic forms may be XML files. The production of electronic forms may also include conversion of paper forms to electronic images using OCI technology, prior to the step of conversion to actual electronic forms. A number of commercial products may be used for the conversion process, and are loaded and executable on laptop 600. For example, photo and imaging software may be employed as well as commercial forms conversion software such as FORMBRIDGE produced by TEXCEL and FORMFLOW produced by ACCELIO. XML files representing the converted forms are then stored and managed on file server 602.

Laptop 600 is also used to develop web sites that serve as the single access point for customers to access and submit forms. Moreover, various software development suites may be used to build the applications in conjunction with the application frameworks that are supplied in the application platform as described above. Such software development suites may include capabilities for coding using ASP, XML, SQL and other languages employed by the forms processing system being built. The appropriate software development suites and tools will be readily recognized and selected by those skilled in the art.

Integration server 604 includes an application server that contains, as one component, a translator for mapping data between file server 602, the single access point web page, and government agency processing systems. The application server is also employed on web services servers 606. Database server 608 functions to store transaction and customer data, as described above.

FIG. 7 illustrates an exemplary embodiment of the invention wherein government forms are rapidly prepared for presentation and processing. First, if necessary, OCR software 700 is utilized to convert paper forms 702 to PDF files 704 having images of the paper forms. A primary converter 706, such as FORMBRIDGE by TEXCEL, is then used to convert the PDF files to electronic forms 708 including a plurality of blank data fields that correspond to blank spaces on the paper forms 702 or PDF files 704 where information would be written by a customer. Although FORMBRIDGE is an exemplary product that can be used to perform the conversion of paper forms to electronic forms, any electronic forms translator software may be employed for this purpose, in accordance with the teachings of the present invention.

As will be recognized by those skilled in the art, electronic forms translator software programs function by reading a computer image of a paper form, recognizing and identifying different portions of that form, and converting the computer image of the paper form to an electronic form. The electronic form not only visually represents the computer image of the paper form, but also contains the identified different portions of that form, some of which may subsequently be interacted with by a user. Examples of portions of an electronic form that could be interacted with by a user include data fields in which a user would be able to enter data. The data fields in the electronic for would correspond to blank spaces on the paper form, where information is entered by hand.

To convert a paper form to an electronic form, first the electronic forms conversion software reads a computer image of the paper form that includes areas of text, such as instructions, and areas that are blank and intended to receive information entered by a customer. The electronic form translator software, using pattern recognition technology that focuses on standard practices of demarcating these areas of text and areas of blank spaces, such as with lines or boxes, identifies the blank areas and converts these blank areas to data entry fields that are included in the converted electronic form. If necessary, a secondary development tool 710, such as FORMFLOW by ACCELIO, can be used to perform minor clean-up modifications to the electronic forms 708. Such modifications might include, for example, identifying areas of the converted electronic form that should include data fields but were for some reason unrecognized by the electronic form converter software as being such areas. After the PDF files 704 are processed with primary converter 706 and secondary development tool 710, the final output is converted electronic forms 712. Once converted electronic forms 712 are produced, an associated record 714 is entered into database 716, which resides on a file server that is part of the forms processing system being developed.

Figure 8:
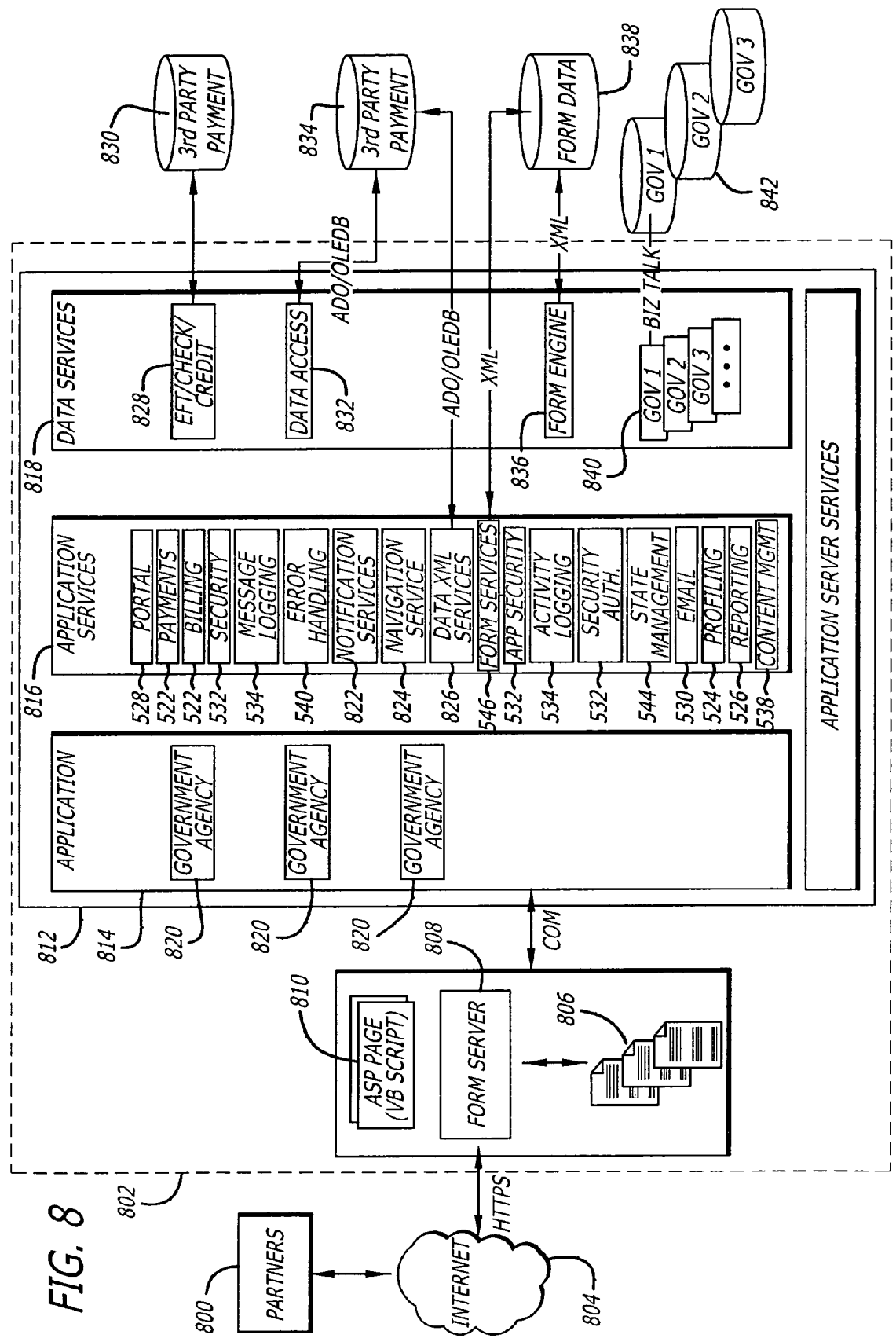
FIG. 8 illustrates an exemplary embodiment of the invention involving an architecture for an efficient government forms processing system.

FIG. 8 illustrates an exemplary embodiment of the invention involving an architecture for an efficient government forms processing system. Business partners 800 access web services component 802 via a communications network 804 such as the Internet. Web services component 802 includes presentation, at the single access point web site, of converted electronic forms 806 as accessed from a form server 808. Operation of the web site content is controlled by ASP pages 810. Web services component 802 communicates with the application component 812 of the exemplary forms processing system. Application component 812 comprises applications 814, application services 816 and data services 818.

Figure 5:
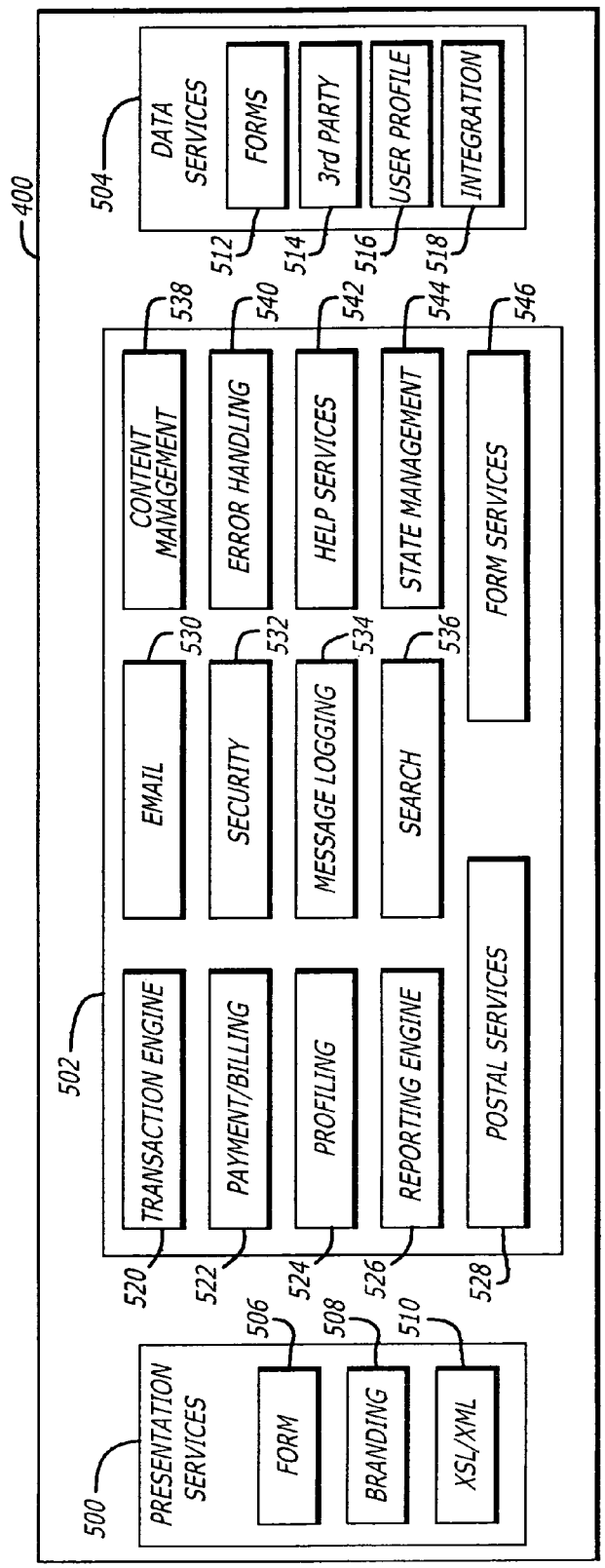
FIG. 5 illustrates an exemplary embodiment of the invention involving computer applications that are utilized for supporting efficient government forms processing.

As described above, applications 814 include any of a plurality of applications 820 based on government agencies and functions. These include applications for state sales and use tax, insurance, workforce development, electronic child support, integrated police management, paperless courts, offender transportation logistics, higher education electronic services, on-line training, budgeting and financial analysis, and withholding tax. Application services 816, which support and provide the underlying functionality of applications 814, include notification services 822 for generating notification of forms processing activities and events to users, a navigation service 824 assisting user navigation through the forms processing system, and a variety of data XML services 826 for handling the data type. Other application services, already described in detail above with reference to FIG. 5, include a portal service 528, payment and billing service 522, security, application security and security authentication services 532, message logging 534, error handling 540, form services 546, activity logging 534, state management 544, e-mail services 530, a profiling service 524, reporting 526, and content management 538.

Finally, data services component 818 includes a variety of services for managing, maintaining and processing data generated from the other components of the forms processing system. An EFT, check, and credit verification service 828 communicates with third party payment service providers 830. A data access service 832 communicates with user information database 834, which is also in communication with data XML services 826 of application services component 816. A form engine 836 manages data from customer-submitted electronic forms, and stores and retrieves the data in database 838, which is also in communication with form services 546. Finally, government data conversion feature 840 operate to convert form data to appropriate formats for the government agency systems to which they will be transmitted. In order to accomplish the conversions reliably, government data conversion feature 840 is in communication with government agency systems 842 via a translator such as, for example, the BIZTALK translator component of MICROSOFT BIZTALK SERVER.

Figure 9:
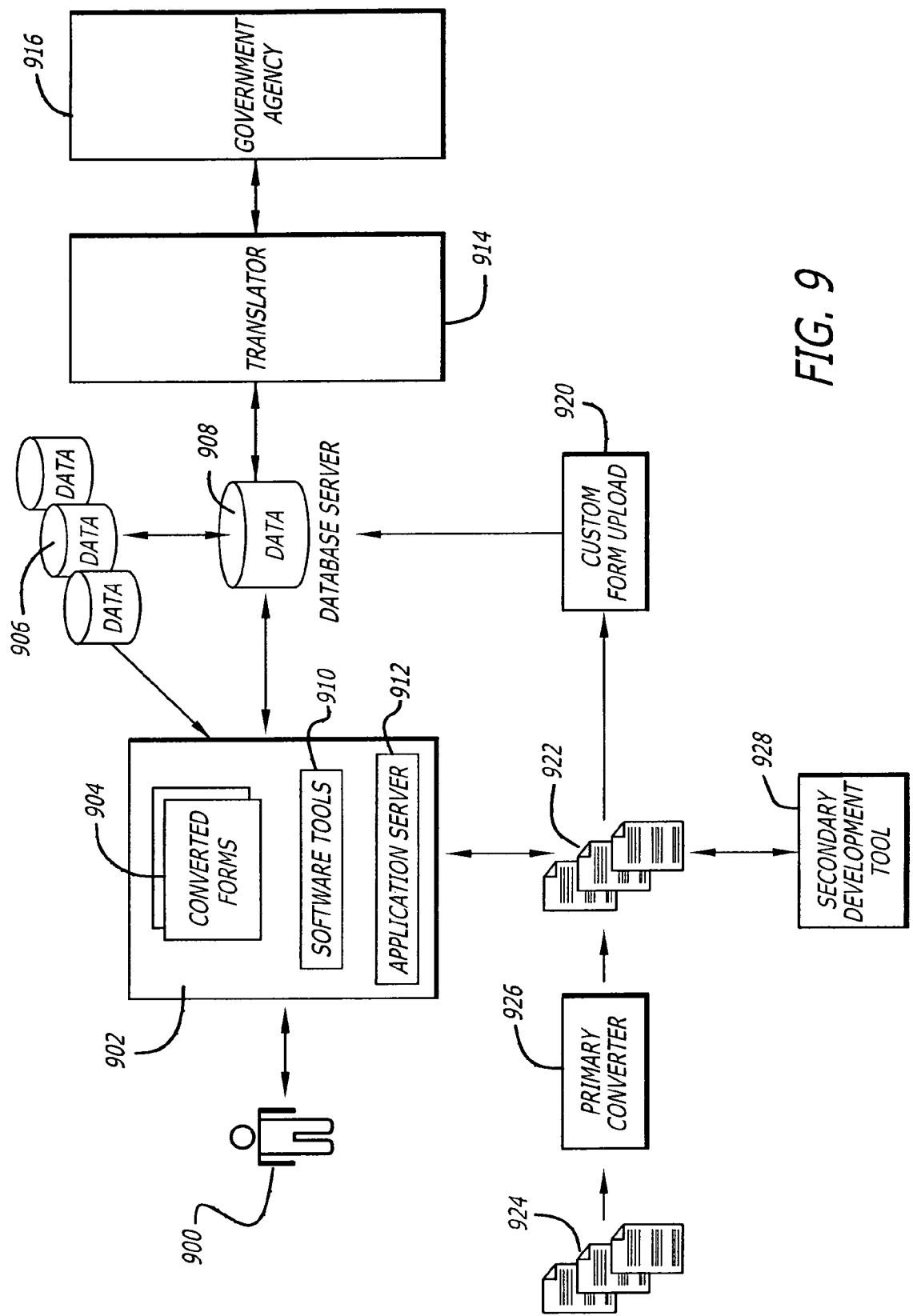
FIG. 9 illustrates an implementation of an exemplary embodiment of the invention wherein a user accesses an efficient government forms processing system for completing and filing a government form.

FIG. 9 illustrates an implementation of an exemplary embodiment of the invention wherein a user accesses an efficient government forms processing system for completing and filing a government form. A customer 900 accesses web services 902 at a single access point for submitting filings to one of a plurality of government agencies. The single access point is, in the exemplary embodiment, a web site. Displayed at the web site, through web services 902, is a library of converted electronic forms 904 stored in file server databases 906. The customer 900 selects a form from the library of converted electronic forms 904, and the selected form is presented to the customer 900 on the web site for completion. First, a database server 908 is queried to determine whether data specific to this customer and pertinent to any of the blank data fields of the selected form have been previously stored. If so, the data is used to populated those blank data fields prior to presenting the form. The customer then enters data into the remaining blank data fields of the displayed electronic form, using a peripheral data entry device such as a computer keyboard or mouse, to complete the form. When the customer 900 completes the form and submits the completed form for submission to a government agency, software tools 910, as previously described, and application server 912 operate to begin processing and handling the data that was entered by the customer 900. Data is retrieved from the completed form and stored in database server 908. Then, a translator component 914 such as, for example, MICROSOFT BIZTALK SERVER, converts the data from the completed form to a format applicable for the selected application dedicated to the appropriate government agency 916 to which the form is to be transmitted for filing. Database server 908 also includes forms and form data, such as custom forms 920 or converted forms 922 that have been converted from government paper forms 924 with a primary converter 926 and, if necessary, a secondary development tool 928.

FIG. 10 illustrates an exemplary embodiment of the invention involving an computer application architecture for processing electronic forms. When a customer makes a form selection at the single access point web site from the electronic form library, a GetForm ASP component 1000 retrieves an existing computer converted electronic form from the file server or creates a new form. It then calls primary form controller 1002, which, in the exemplary embodiment, is a Dynamic Link Library (DLL). primary form controller 1002 receives inputs related to user identification and selected form identification. Such inputs include, for example, transaction identification associated with the type of transaction used with the selected form, for identification that directly identifies the selected form, user identification information, and origin identification that is associated with the selected form and utilized by the forms processing system to determine which government agency the form, once completed, is to be transmitted to. Based on the value of the transaction identification, primary form controller 1002 either loads a converted electronic form from the file server or initializes a form creation function to create a new electronic form. Once established, the selected form is loaded into a function that operates to display it on the single access point web site. The primary form controller 1002 also contains other logic for displaying forms on the single access point web site.

A secondary forms controller 1004 provides common forms services for all applications, associated with all government agencies, to utilize. An initialization function makes the call to start a new form in the database server and pre-populate it with common data, including customer-specific data associated with the customer who selected the form. A load function then retrieves an existing document from the database and passes it back to the application, while a save function writes the new form data, supplied by the customer, back to the database server. Finally, software tools 1006 as described above provide common services to all applications, associated with all government agencies, for runtime execution. A data access component is included for communicating with database 1008 on behalf of all the applications. This communication is supported by a translator component of the application server, as described above.

FIG. 11 illustrates an interaction between an on-line electronic form and a computer system for managing and processing the form. The single access point web page 1100 serves at its front-end to present a selected form 1102, via an HTML or DHTML document 1104, for example, to a customer. It serves at its back end to integrate customer communications with underlying applications 1106 such as through ASP pages 1108. The communication assisted by ASP pages 1108 specifically occurs with software tools 1110 and any desired custom software 1112 within an architecture services component 1114 of the forms processing system. Software tools 1110 also interface with form server 1116, also of architecture services component 1114. A fourth integral component of architecture services component 1114 is application server 1118, which serves to manage the events and modules involved in the forms processing system.

Form server 1116 communicates with components of information layer 1120, specifically by providing stored electronic forms 1122 and providing stored data from stored completed forms to various data access application services 1124 as described above. Eventually, the accessed data, including new data entered into a blank or pre-populated form by a customer, is stored in a database 1126. Message queuing, indicated at arrow 1128, then transpires between information layer 1120 and integration bus 1130, wherein a translator component 1132 of the application server modifies the data such that it may be effectively communicated to the appropriate government agency when the completed form is filed.

Figure 12:
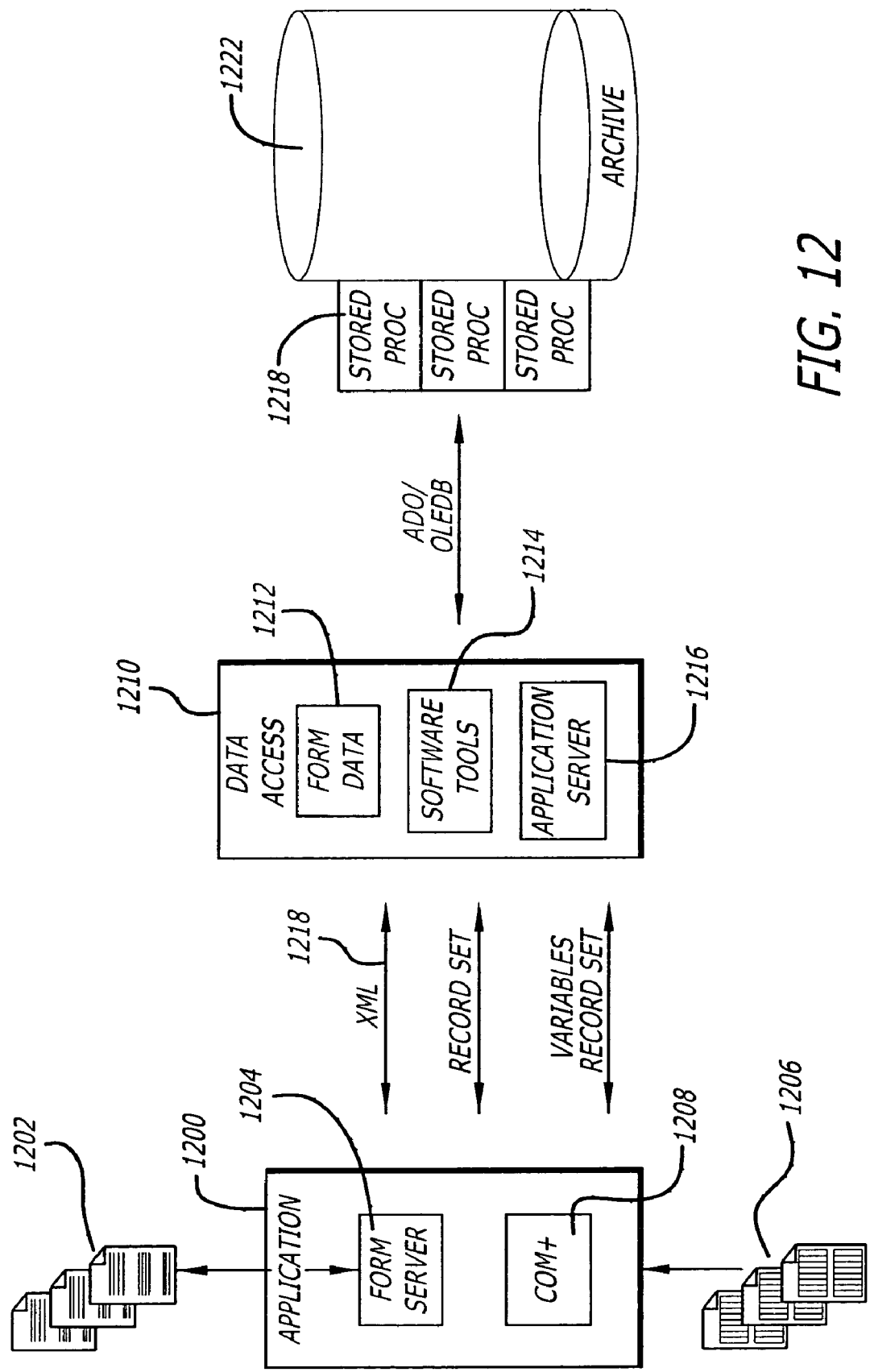
FIG. 12 illustrates an exemplary embodiment of the invention involving data architecture utilized in an efficient government forms processing system.

FIG. 12 illustrates an exemplary embodiment of the invention involving data architecture utilized in an efficient government forms processing system. The data architecture illustration represents how, in an exemplary embodiment, data is accessed and stored between forms and a database server component of the forms processing system. An application 1200 from within the vertical application set described above receives cached forms 1202 into a form server 1204, and also receives cached lookup tables 1206. Using COM+ as indicated at 1208, application 1200 interfaces with data access software components 1210. Specifically, form data services 1212, software tools 1214 and application server 1216 serve to support XML conversion 1218 and stored procedures 1220. In this manner, archives are created and stored in database 1222.

It is to be understood that other embodiments may be utilized to practice the present invention and structural and functional changes may be made thereto without departing from the scope of the present invention. The foregoing description of exemplary embodiments of the present invention have been presented for purposes of enablement, illustration, and description. They are not intended to be exhaustive of or to limit the present invention to the precise forms discussed. Many modifications and variations of the present invention are possible in light of the above teachings. For example, the invention may be practiced on a number of different computer systems and may utilize a variety of software application embodiments. Further, the invention is not limited to use with a web page embodiment of the single access point for submitting filings to one of a plurality of government agencies over the Internet. Rather, the invention may utilize any computer site as the single access point and may utilize any communications network, including LANs and WANs, to file converted electronic government forms in one of a plurality of government agencies. Moreover, systems and methods of the present invention need not be limited to government forms. Rather, embodiments of the invention may be used to provide rapid development of forms processing systems and methods for efficient processing of forms for organizations, individuals or businesses who receive and process forms for purposes not associated with government or government agencies. In short, the invention is limited only by the following claims.

We claim:

1. A computer-readable storage medium storing computer-executable program instructions which, when executed by a processor, perform a method for automating the entry of information into a database and transmittal of the information to at least one of a plurality of government agencies, the method comprising:

selecting at least one of a plurality of applications requiring a form to be filed with the at least one of a plurality of government agencies;

converting a blank paper form to a blank computer form, the blank computer form having data entry areas that correspond to each separate area on the blank paper form without having to individually code each data entry area in the blank computer form, the blank computer form having identifiers related to the at least one of a plurality of applications;

accessing the blank computer form through any one of a plurality of access points, wherein each of the plurality of access points corresponding to a link on a unique website corresponding to the one of the plurality of government agencies operably coupled to the database wherein the link accesses the database;

presenting the blank computer form to a user for completion on a screen;

allowing the user to enter the information in the data entry areas on the blank computer form to provide a completed computer form;

storing the information that is entered in the data entry areas in the database;

identifying the at least one of a plurality of government agencies that should receive the completed computer form, wherein the at least one of a plurality of government agencies that should receive the completed computer form is identified using software that determines the appropriate at least one government agency by accessing associations between stored forms and the at least one government agency and determines the proper format for information contained in the computer form based on the requirements of the at least one government agency; and transmitting the completed computer form to all identified government agencies, wherein the government agencies are identified using the software that determines the appropriate at least one government agency by accessing associations between stored forms and the at least one government agency and determines the proper format for information contained in the computer form based on the requirements of the at least one government agency, wherein the application is selected from the group consisting of application for state sales and use tax, application for insurance, application for workforce development, application for electronic child support, application for integrated police management, application for paperless courts, application for offender transportation logistics, application for higher education electronic services, application for on-line training, application for budgeting and financial analysis, and application for withholding tax.

2. The method of claim 1 further comprising:
saving information previously entered by the user in the database;
identifying the user; and
automatically populating at least one of the data entry areas with information from the database.

3. The method of claim 1 further comprising:
receiving an electronic document from the user; and
attaching the electronic document to the computer form.

4. The method of claim 1 further comprising:
receiving a digital signature from the user; and
attaching the digital signature to the computer form.

5. The method of claim 1 wherein the computer form includes an XML document.

6. The method of claim 1 wherein the computer form is posted and displayed on a Web site.

7. The method of claim 1 wherein the screen is part of a client computer, the blank computer form and database are associated with a server computer, and the client computer and the server computer communicate through a computer network.

8. The method of claim 7 wherein the computer network includes the Internet.

9. The method of claim 1 wherein the database accessible by the software stores a plurality of associations between the computer form and the plurality of government agencies.

10. The method of claim 1 wherein data mapping software converts the completed computer form information to a data format required by the at least one of a plurality of government agencies that should receive the completed computer form information.

11. A computer-readable storage medium storing computer-executable program instructions which, when executed by a processor, perform a method for automating the entry of information into a database and transmittal of the information to at least one of a plurality of government agencies, the method comprising:

selecting at least one of a plurality of applications requiring a form to be filed with the at least one of a plurality of government agencies;

accessing a blank computer form through any one of a plurality of access points, wherein each of the plurality of access points corresponding to a link on a unique website corresponding to the one of the plurality of government agencies operably coupled to the database wherein the link accesses the database;

presenting the blank computer form to a user for completion, the blank computer form having been electronically converted from a blank paper form and visually representing the blank paper form including a plurality of data entry areas that correspond to a plurality of separate areas for entering information on the paper form, wherein the blank computer form was automatically converted from the blank paper form without having to individually code each of the plurality of data entry areas, the blank computer form having identifiers related to at least one of a plurality of applications;

receiving information from the user in the data entry areas on the blank computer form to provide a completed computer form;

storing the information that is entered in the data entry areas in the database;

identifying the at least one of a plurality of government agencies that should receive the completed computer form wherein the at least one of a plurality of government agencies that should receive the completed computer form is identified using software that determines the appropriate at least one government agency by accessing associations between stored forms and the at least one government agency and determines the proper format for information contained in the computer form based on the requirements of the at least one government agency; and transmitting the completed computer form to all identified government agencies, wherein the government agencies are identified using the software that determines the appropriate at least one government agency by accessing associations between stored forms and the at least one government agency and determines the proper format for information contained in the computer form based on the requirements of the at least one government agency, wherein the application is selected from the group consisting of application for state sales and use tax, application for insurance, application for workforce development, application for electronic child support, application for integrated police management, application for paperless courts, application for offender transportation logistics, application for higher education electronic services, application for on-line training, application for budgeting and financial analysis, and application for withholding tax.

12. The method of claim 11 further comprising:
saving information previously entered by the user in the database;
identifying the user; and
automatically populating at least one of the data entry areas with information from the database.

13. The method of claim 11 further comprising:
receiving an electronic document from the user; and
attaching the electronic document to the computer form.

14. The method of claim 11 further comprising:
receiving a digital signature from the user; and
attaching the digital signature to the computer form.

15. The method of claim 11 wherein the database accessible by the software stores a plurality of associations between the computer form and the plurality of government agencies.

16. The method of claim 11 wherein data mapping software converts the completed computer form information to a data format required by the at least one of a plurality of government agencies that should receive the completed computer form information.

17. A computer for automating the entry of information into a database and transmittal of the information to at least one of a plurality of government agencies, comprising:

a computer processor configured for receiving a user selection of at least one of a plurality of applications requiring a form to be filed with the at least one of a plurality of government agencies, and converting a blank paper form to a blank computer form, the blank computer form having data entry areas that correspond to each separate area on the blank paper form, wherein the computer processor is operably coupled to a plurality of access points each corresponding to a link on a unique website corresponding to the one of a plurality of government agencies operably coupled to the database wherein the link accesses the database and wherein the computer form is accessible from any of the access points and the blank computer form having identifiers related to at least one of a plurality of applications;

a computer screen for displaying the blank computer form to the user;

a computer peripheral data entry device for entering information in the plurality of data fields to generate a completed computer form; and the computer processor further configured to identify the at least one of a plurality of government, agencies for receiving the completed computer form, send the entered information to the database for storage, and transmit the completed computer form to all identified government agencies, wherein the at least one of a plurality of government agencies for receiving the completed computer form is identified using software that determines the appropriate at least one government agency by accessing associations between stored forms and the at least one government agency and determines the proper format for information contained in the computer form based on the requirements of the at least one government agency, wherein the application is selected from the group consisting of application for state sales and use tax, application for insurance, application for workforce development, application for electronic child support, application for integrated police management, application for paperless courts, application for offender transportation logistics, application for higher education electronic services, application for on-line training, application for budgeting and financial analysis, and application for withholding tax.

18. The computer of claim 17 wherein the database is remote from the computer and in communication with the computer processor through the Internet.

19. The computer of claim 17 further comprising:

a computer storage device for storing a plurality of associations between computer forms and appropriate government agencies for processing completed versions of the computer forms;

the computer processor also operable for accessing the computer storage device and according to the stored associations selecting, from a plurality of government agencies, an appropriate government agency to process the selected computer form; and the computer processor also operable for transmitting the entered information to the identified appropriate government agency.

20. The computer system of claim 19 wherein the database accessible by the software stores the plurality of associations between the computer form and the plurality of government agencies.

21. The computer system of claim 17 wherein data mapping software converts the completed computer form information to a data format required by the at least one of a plurality of government agencies that should receive the completed computer form information.

22. A computer system including at least one processor for automating the entry of information into a database and transmittal of the information to at least one of a plurality of government agencies, comprising:

a server computer adapted to automatically convert a blank paper form to a blank computer form that includes a data entry area that corresponds to each separate area on the paper form without having to individually code each data entry area in the computer form, the blank computer forms having identifiers related to at least one of a plurality of applications;

a client computer adapted to allow a user to select at least one of a plurality of applications requiring a form to be filed with the at least one of a plurality of government agencies, access the blank computer form through any one of a plurality of access points, wherein each of the plurality of access points corresponding to a link on a unique website corresponding to the one of the plurality of government agencies operably coupled to the database wherein the link accesses the database, and present the blank computer form to the user for completion on a screen;

a computer peripheral data entry device operatively connected to the client computer, and adapted to allow the user to enter the information in the data entry areas on the blank computer form to provide a completed computer form;

the server computer is further adapted to identify which of the at least one of a plurality of government agencies should receive the completed computer form, store the information that is entered in the data entry areas in the database, and transmit the completed computer form to all identified government agencies, wherein the at least one of a plurality of government agencies which should receive the completed computer form is identified using software that determines the appropriate at least on government agency by accessing associations between stored forms and the at least one government agency and determines the proper format for information contained in the computer form based on the requirements of the at least one government agency, wherein the application is selected from the group consisting of application for state sales and use tax, application for insurance, application for workforce development, application for electronic child support, application for integrated police management, application for paperless courts, application for offender transportation logistics, application for higher education electronic services, application for on-line training, application for budgeting and financial analysis, and application for withholding tax.

23. The computer system of claim 22 wherein the database accessible by the software stores a plurality of associations between the computer form and the plurality of government agencies.

24. The computer system of claim 22 wherein data mapping software converts the completed computer form information to a data format required by the at least one of a plurality of government agencies that should receive the completed computer form information.

25. A computer system including at least one processor for automating the entry of information into a database and transmittal of the information to at least one of a plurality of government agencies, comprising:

a server computer adapted to automatically convert a blank paper form to a blank computer form that includes a plurality of data entry areas that correspond to each separate area on the paper form without having to individually code each data entry area in the computer form, the blank computer forms having identifiers related to at least one of a plurality of applications;

a data transmission means for allowing a user to select at least one of a plurality applications requiring a form to be filed with at the least one of a plurality of government agencies, accessing the blank computer form through any one of a plurality of access points, wherein each of the plurality of access points corresponding to a link on a unique website corresponding to the one of the plurality of government agencies operably coupled to the database wherein the link accesses the database, and transmitting the related blank computer form to a user for completion by entering data into the plurality of data entry areas to provide a completed computer form;

a data receiving means for receiving the entered data from the user;

a means for identifying which of the at least one of a plurality of government agencies should receive the completed computer form, wherein the at least one of a plurality of government agencies which should receive the completed computer form is identified using software that determines the appropriate at least one government agency by accessing associations between stored forms and the at least government agency and determines the proper format for information contained in the computer form based on the requirements of the at least one government agency;

the server computer further adapted to store the information that is entered in the data entry areas in the database and transmit the completed computer form to all identified government agencies, wherein the government agencies are identified using the software that determines the appropriate at least one government agency by accessing associations between stored forms and the at least one government agency and determines the proper format for information contained in the computer form based on the requirements of the at least one government agency, wherein the application is selected from the group consisting of application for state sales and use tax, application for insurance, application for workforce development, application for electronic child support, application for integrated police management, application for paperless courts, application for offender transportation logistics, application for higher education electronic services, application for on-line training, application for budgeting and financial analysis, and application for withholding tax.

26. The computer system of claim 25 wherein the database accessible by the software stores a plurality of associations between the computer form and the plurality of government agencies.

27. The computer system of claim 25 wherein data mapping software converts the completed computer form information to a data format required by the at least one of a plurality of government agencies that should receive the completed computer form information.

* * * * *

UNITED STATES PATENT AND TRADEMARK OFFICE
CERTIFICATE OF CORRECTION

PATENT NO. : 7,669,116 B2
APPLICATION NO. : 10/107719
DATED : February 23, 2010
INVENTOR(S) : Iain Lopata et al.

It is certified that error appears in the above-identified patent and that said Letters Patent is hereby corrected as shown below:

In claim 1, column 14, line 44, "corresponding" should read -- corresponds --.

In claim 11, column 15, line 59, "corresponding" should read -- corresponds --.

In claim 17, column 17, line 19, "government, agencies" should read -- government agencies --.

In claim 22, column 18, line 17, "corresponding" should read -- corresponds --.

In claim 22, column 18, line 36, "at least on" should read -- at least one --.

In claim 25, column 19, line 6, "a plurality applications" should read -- a plurality of applications --.

In claim 25, column 19, line 7, "at the least one" should read -- the at least one --.

In claim 25, column 19, line 10, "corresponding" should read -- corresponds --.

Signed and Sealed this

Twentieth Day of April, 2010

David J. Kappos
*Director of the United States Patent and Trademark Office*